Sept. 7, 1954   J. H. SWEER   2,688,742
SMOOTH TRACKING OF INPUT VOLTAGE
Filed July 31, 1951   2 Sheets-Sheet 1
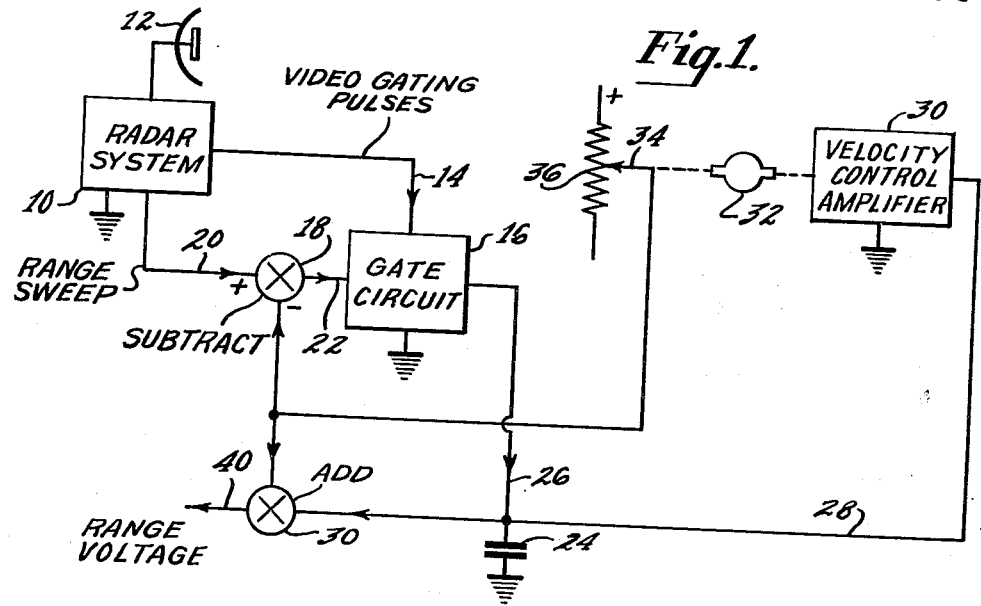
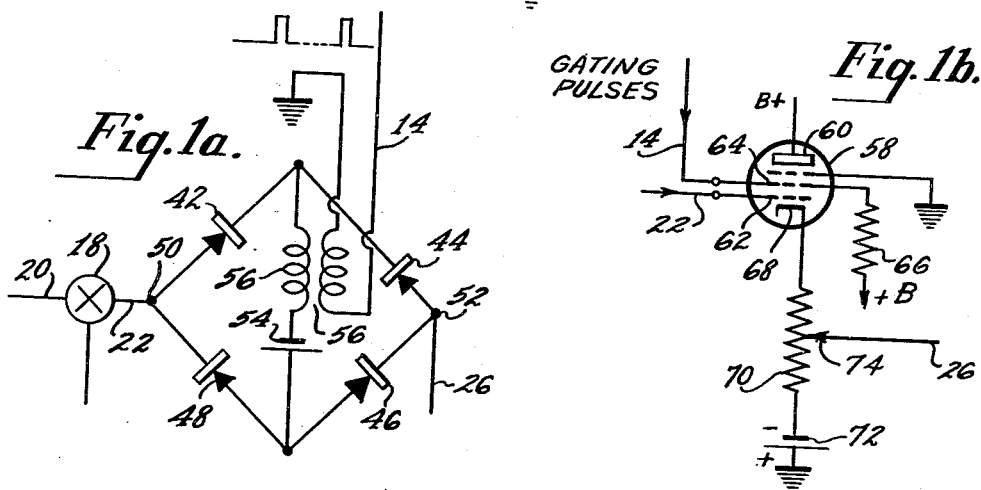
INVENTOR
John H. Sweer
BY
ATTORNEY

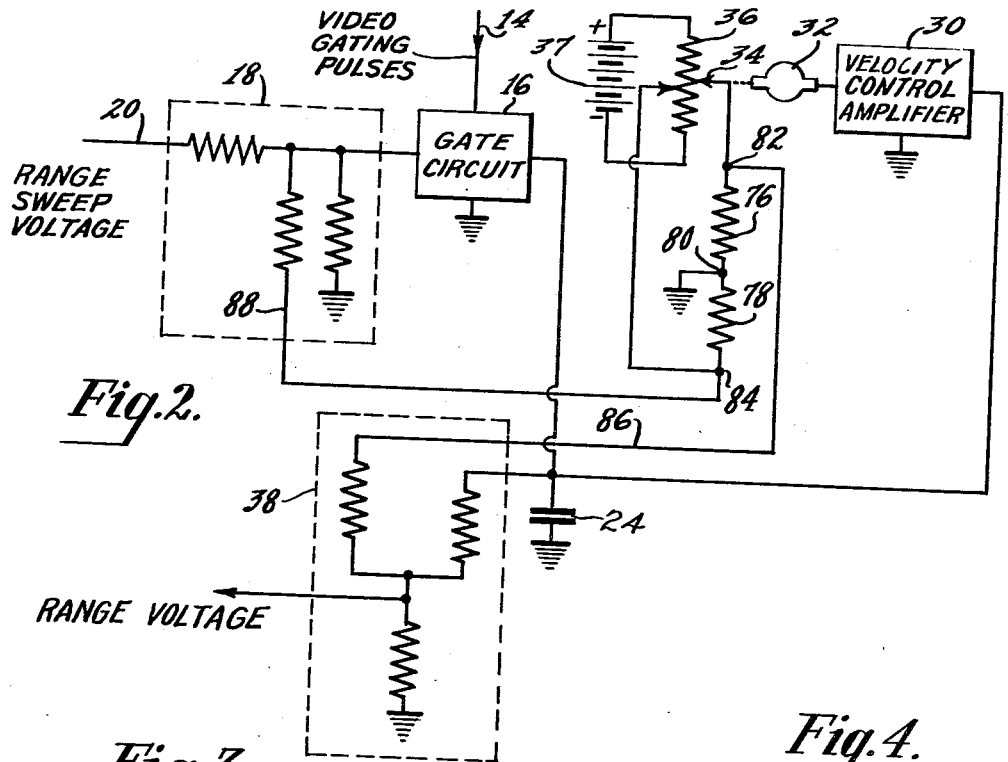
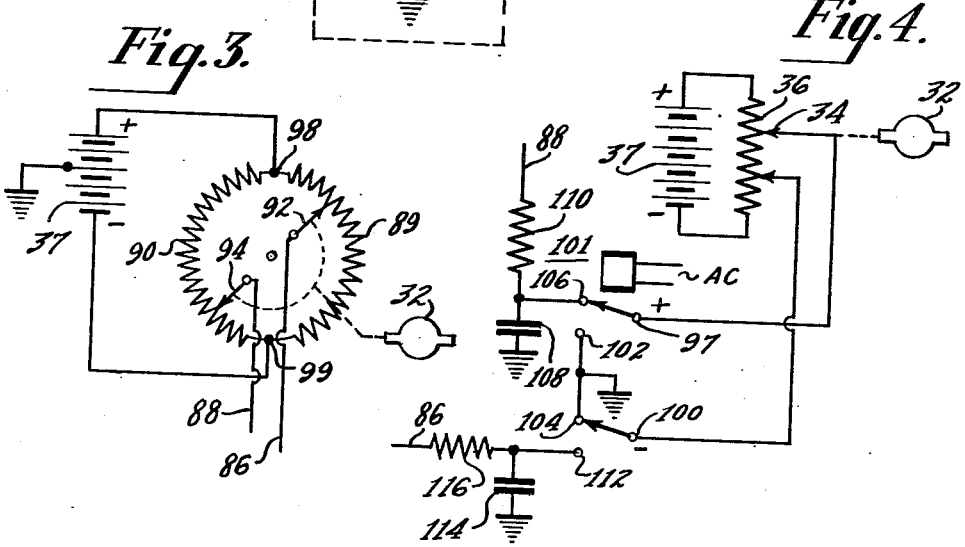

Patented Sept. 7, 1954

2,688,742

UNITED STATES PATENT OFFICE 2,688,742

SMOOTH TRACKING OF INPUT VOLTAGE

John H. Sweer, Collingswood, N. J., assignor to Radio Corporation of America, a corporation of Delaware Application July 31, 1951, Serial No. 239,574

14 Claims. (Cl. 340—345)

1

The present invention relates to the electrical tracking of electrical input data, and more particularly to a method and means for deriving a voltage smoothly tracking an input voltage.

It is highly desirable at times to track smoothly electrical data which is available only periodically at discrete instants. For example, in pulsed radar (radio echo detection and ranging systems) a pulse of radio frequency energy is emitted from an antenna, and pulse echoes from a target are received. The time between transmission and reception of a pulse is measured as a measure of the range. This range data may be made readily available as a pulse of voltage having an amplitude proportional to the range. However, as the echo pulses are received only at discrete instants, the range data is available only at the time when the pulses are received. It is often desirable to track this range data voltage smoothly, that is, to have available a voltage which is smoothly changing and accords with the target range at the instants when the target range is measured. The utility of such smooth tracking voltages will be appreciated by those skilled in the radar art. However, the method and means herein disclosed may obviously be used under other circumstances where tracking of discrete voltage data is desired.

It is not unknown in fact, to derive tracking voltages such as those described. For instance, a method which is simple in principle is to provide an electrical analogue storage, such as by a high-quality condenser, which is caused, at each instant at which input data is available, to be charged to that particular voltage which is the input at that instant. The condenser then retains this charge until the next data instant. There is thus obtained a tracking voltage which is a stepwise approximation to the input. To achieve the next smoother approximation to the input, one may, according to the prior art, employ either of two further refinements. One might, for instance, attach a low-pass passive electrical wave filter; this would provide an output which no longer jumps at the data instants, but does have the undesirable property of lagging behind the actual input, in general. Or one may arrange apparatus to measure an approximate smoothed rate for the data, and then, after integrating this rate in a servo or like device, add to the voltage stored by the condenser. Quite commonly these techniques can be shown to be sufficient in principle; but it is not ordinarily easy or convenient to provide properly precise devices for the tachometers, servo systems, integrators, and, most essentially, the storage con-

2 denser. The condenser, and its associated charging and discharging circuit elements, must be capable of holding, perhaps for many seconds (in a radar example) an analogue voltage to within a precision which may readily be required to be one part in a thousand or more. Thus leakage time constants of the order of several hours may be required, and this is not convenient to achieve in many practical cases.

It is an object of the present invention to provide a novel means and method of tracking, without appreciable lag, an input available at only discrete instants.

It is another object of the invention to provide means and method of so tracking such an input voltage, not requiring the use of a high grade extremely low leakage condenser storage for the voltage being tracked. A condenser storage is indeed employed in the present invention; but its function is to store only an approximate rate for the quantity being tracked, rather than the actual quantity itself; thus requirements on its quality (leakage time constant, for instance) are in general far less stringent.

It is another object of the invention to provide a novel means and method for deriving a tracking voltage with rate voltage correction.

A further object of the invention is to provide a simple means and method for deriving an anticipatory tracking voltage.

According to the invention, from the input voltage to be tracked is subtracted a secondary voltage having its rate of change controlled by the difference voltage, preferably by means of a rate control servo loop. This controlled secondary voltage is added to the difference voltage to secure a sum voltage, which is the desired tracking voltage. It may readily be shown that the sum voltage so obtained has characteristics of anticipatory rate correction, and by the means and method of the invention, the sum voltage may afford a smooth tracking voltage with anticipatory rate correction, which smoothly interpolates values of voltage during the intervals between data instants, when the data is not available.

Further objects, advantages, and novel features of the invention will be made apparent from the following description when taken in connection with the accompanying drawings, in which like parts have like reference numerals and in which:

Fig. 1 is a diagram largely in block form illustrating schematically a circuit according to the invention as employed with a radar system;

Figs. 1a and 1b are diagrams schematically illustrating alternative forms of a gating circuit shown in block form in Fig. 1;

Fig. 2 is a more particularized diagram schematically illustrating one way of deriving the desired sum and difference voltages; and Figs. 3 and 4 are diagrams schematically illustrating alternative ways of deriving the desired sum and difference voltages.

Referring to Fig. 1, a radar system 10 has an antenna 12 from which are emitted pulses of radio frequency energy. As each pulse is emitted, a voltage may be initiated increasing from some predetermined value at a uniform rate with time. Such a voltage is sometimes available from the radar system indication arrangement for employment as a range sweep voltage, and hence is so termed herein. As each echo pulse from a particular target is received, it may be supplied as a gating signal having, for example, the time duration of the reflected pulse, and a predetermined amplitude. These pulses may be termed video gating pulses. The gating pulses are applied by a connection 14 to control a gate circuit 16. The range sweep voltage is applied to a subtraction circuit 18 by a connection 20. The subtraction circuit 18 has an output connected by connection 22 to the gate circuit 16. The output of the subtraction circuit is the difference between the range sweep voltage on connection 20 and a voltage having a rate of change controlled by a servo system, as will appear more fully hereinafter. The difference voltage on connection 22 is gated by the gating circuit and passed as pulses only on receipt of video gating pulses. Thus the input voltage is intermittently sampled during periods when the input voltage has subtracted from it the voltage, the rate of change of which is controlled by the servo system.

A storage capacitor 24 receives the gated (intermittently sampled) difference voltage applied from gate circuit 16 by a connection 26. The voltage across capacitor 24 is applied by a connection 28 to a velocity control amplifier 30 which controls the angular velocity or speed of a motor 32 in response to the capacitor voltage. The shaft of motor 32 is connected to the arm 34 of a potentiometer 36 which has impressed across it a fixed voltage.

The voltage from the potentiometer arm 34 is connected to the subtraction circuit 18 and also to an addition circuit 38. The voltage derived at the potentiometer arm 34 is subtracted from the range sweep voltage in the subtraction circuit 18.

In the addition circuit 38, the voltage derived at the potentiometer arm 34 is added to the voltage across the storage capacitor 24, and the sum voltage which is the output of the addition circuit may be taken by a connection 40 for use as desired.

A simple analysis of the operation may be made considering the circuit to be at first in an initial state of quiescence, with no voltages across the capacitor 24 and with zero voltage taken off at the potentiometer arm 34. On receipt of a gating pulse at connection 14, a voltage is passed by the gate circuit 16 to appear on connection 26. Due to the linear variation of the range sweep voltage, the amplitude of the pulse passed by the gate voltage is directly proportioned to the time between initiation of the sweep voltage and the reception of the video gating pulse. Therefore, the voltage at connection 26 is proportional to the range of the echoing object. This voltage at connection 26 starts the motor 32 by the response of amplifier 30. As successive pulses are received, it may be assumed that the input voltage is increasing at a constant rate by equal increments. Now as soon as the motor has turned the potentiometer arm from its zero position, a voltage will appear on the potentiometer arm 34 and this voltage will be subtracted from the input voltage; this process tends to make the voltage applied at connection 26 less, and thus to reduce the speed at which the motor is turning the arm 34. It is clear that the tracking system may now reach a state of equilibrium in which the storage capacitor 24 voltage has a steady value just sufficient to control amplifier 30 and potentiometer arm 34 to make the subtracted voltage (or the secondary voltage) always just less than the input voltage (at the moment the gate circuit is open) by the same constant amount equal to the capacitor voltage. Thus the capacitor voltage remains unchanged at a value representing the rate of change of the voltage at potentiometer arm 34, which rate of change is the rate of change of the input voltage. The potentiometer arm 34 voltage has a rate of change proportional to the capacitor voltage, and hence a voltage value representing the integral of this capacitor voltage over a time from reception of the first gating pulse. If the capacitor 24 voltage be considered a rate voltage, the potentiometer arm voltage is a position voltage which is corrected by the addition of the rate voltage in addition to circuit 38 to give a position voltage (at connection 40) which has anticipatory correction. The condition that such an equilibrium or steady state may be reached is just that, if unit voltage be applied at the input to the servo, the arm 34 will turn, in one data interval, by an amount sufficient to change its voltage by one unit.

The gate circuit 16 may be of different types, two of which are illustrated in Figs. 1a and 1b. In Fig. 1a, four crystal diodes 42, 44, 46, 48 are connected in a bridge circuit, as shown. The arrows point in the direction of electron flow through the diodes. The difference voltage from connection 22 is applied at one diagonal terminal 50, and the gated output is taken from another diagonal terminal 52 of a pair of diagonal terminals across the other pair, in series with a biasing voltage from a suitable source 54. The gating video pulses are applied by a transformer 56 in a polarity to oppose the biasing voltage.

In operation, when no video pulses are applied, the voltage at terminal 50 is disconnected from terminal 52. When the gating video pulses are applied in a polarity opposite to that of the battery and in a uniform amplitude sufficient to overcome this bias, current may be drawn through the bridge circuit from diagonal terminal 52 to 50 (or vice versa as the case may require), and the voltage at terminal 50 is applied to the terminal 52.

In Fig. 1b, a pentode tube 58 has an anode 60 connected to a suitable B+ supply; a control grid 62 connected to connection 22 to receive the input voltage; a screen grid 64 connected to receive gating pulses from connection 14 and also connected through a resistor 66 to the B+ supply; and a cathode 68 connected through a resistor 70 and a suitable bias source 72 to ground. Output of the gating circuit may be tapped off resistor 70 by a tap 74 which leads to connection 26.

In operation, application of a predetermined amplitude gating pulse to connection 64 causes the tube 58 to conduct, otherwise it is cut off. When in the conducting stage, the voltage at tap 74 is substantially equal to or proportional to the range sweep voltage from connection 22 applied to the control grid 62.

The circuits of Figs. 1a and 1b are exemplary, there being others. It is also apparent that if pulses of input voltage having an amplitude proportional to range were available without the gating circuits shown, that the voltage from potentiometer arm 34 could be suitably subtracted therefrom by appropriate circuitry before being applied to connection 26.

Fig. 2 illustrates in greater particularity how the potentiometer arm 34 voltage may be added in an adding circuit 38 and subtracted in a subtraction circuit 18. A voltage source 37 is connected across the potentiometer 36. The voltage between arm 34 and a center tap on the potentiometer 36 is impressed across a pair of equal serially connected resistors 76, 78 one terminal of each being connected to a common ground connection conventionally indicated at a junction 80. The other terminals, 82 of resistor 76 and 84 of resistor 78, have equal and opposite polarity voltages with respect to ground. These equal and opposite polarity voltages are subtracted and added respectively in the subtraction circuit 18 and addition circuit 38, which may now take the form of resistor networks as illustrated. If the voltage at input 20 is increasing and positive, the polarities are selected so that half the voltage between arm 34 and the center tap of potentiometer 36 is subtracted from the input voltage and the other half is added to the capacitor 24 voltage by connection 88 and 86 respectively.

Fig. 3 illustrates an alternative in which is employed a pair of potentiometers 90 and 89 having ganged arms 92 and 94 respectively. The source 37 is connected to junctions 98 and 99 of the potentiometer. The arms 92 and 94 give oppositely poled outputs with respect to a ground connection at the mid-voltage point of source 37. The opposite polarity voltages from arms 92 and 94 may then be applied to networks such as those shown in Fig. 2 by connections 88 and 86.

Still another alternative is illustrated in Fig. 4. Potentiometer arm 34 may be connected to one terminal 97 of a relay 101 acting as a double pole-double throw switch. Another terminal 100 of relay 101 is connected to a tap on the potentiometer 36. Contact points 102 and 104 of relay 101 are connected at a junction to ground. One other contact point 106 of relay 101 is connected to a voltage smoothing network of capacitor 108 and resistor 110; another terminal 112 of relay 101 is connected through a second voltage smoothing network of capacitor 114 and resistor 116. Contacts 104 and 106 are made at the same time; contacts 102 and 112 are made at the same time. From the smoothing networks, the desired oppositely poled voltages may be applied by connections 88 and 86, to networks such as illustrated in Fig. 2.

It is apparent from the foregoing that the invention discloses novel means and a novel method for deriving an output voltage smoothly tracking an input voltage with rate correction. From the input voltage is subtracted a voltage the rate of change of which is proportional to the difference voltage. The sum of this difference voltage and the rate of change controlled voltage is the desired smoothly tracking output voltage. The rate of change controlled voltage here employed consequently is a voltage which, for an input voltage of constant rate of change, differs from the input voltage by a constant value. When the rate of change controlled voltage is added to the difference voltage, this constant difference is compensated in the output sum voltage, which is therefore a rate corrected anticipatory voltage.

What is claimed is:

1. A system for deriving a tracking voltage from an input data voltage comprising means for deriving a controlled voltage the rate of change of which is directly proportional to a control voltage, means for subtracting the so derived controlled voltage, from the input data voltage and means for employing the difference voltage as the said control voltage, and means for adding the said controlled voltage to the difference voltage, whereby the sum voltage is an anticipatory tracking voltage.

2. A system for deriving a smooth tracking voltage from input data voltage, said system comprising a storage capacitor, means for deriving a secondary voltage having a rate of change controlled by voltage across the capacitor, means for subtracting the secondary voltage from the input data voltage, means for storing the difference voltage on the capacitor as the rate control voltage, and means for adding the secondary and capacitor voltages to derive a sum voltage which smoothly tracks the input data voltage.

3. A system for deriving a tracking voltage from input data voltage comprising means for deriving a pair of substantially equal voltages of opposite polarity each having a rate of change equal to a control voltage, means for subtracting one of said pair of voltages from the input data voltage, means for employing the difference voltage as the said control voltage, and means for adding the other of said pair of voltages to the said difference voltage, whereby the sum voltage smoothly tracks the input voltage.

4. A system for smoothly tracking voltage from an input, comprising a voltage storage element, a velocity control amplifier connected to receive the voltage stored on said element, servo means connected to be controlled by the voltage stored on said element to derive opposite polarity substantially equal voltages the rates of change of which are proportional to the stored voltage, means to subtract one of said opposite polarity voltages from the input voltage and to apply the difference voltage to said storage element, and means to add the other of said opposite polarity voltages and the stored voltage, whereby the sum voltage smoothly tracks the input voltage.

5. A system for smoothly tracking voltage from an input, comprising a storage capacitor, a velocity control amplifier connected to receive the voltage across said capacitor, means comprising a motor the velocity of which is controlled by the amplifier output and at least one potentiometer having an arm driven by said motor to derive opposite polarity substantially equal voltages the rates of change of each of which voltages are proportional to said motor velocity, means to subtract one of said opposite polarity voltages from the input voltage and apply the difference to said storage capacitor, and means to add the other of said opposite polarity voltages and the capacitor voltage, whereby the sum voltage smoothly tracks the input voltage.

6. The system claimed in claim 5, the said voltage deriving means comprising means to connect a voltage source across said potentiometer, a center tap connection to said potentiometer, a pair of equal resistors each having one terminal connected at a junction to one terminal of the other, said opposite polarity voltages being taken respectively between the other terminal of one resistor and said junction, and between the other terminal of the other resistor and said junction.

7. The system claimed in claim 5, the said voltage deriving means comprising a pair of potentiometers with ganged arms, a voltage source connected across both potentiometers, said source having a center tap, said opposite polarity voltages being taken respectively between one arm and said center tap and between the other arm and said center tap.

8. The system claimed in claim 5, the said voltage deriving means comprising a center tap to said potentiometer and a relay having two pairs of contacts arranged to be actuated by alternating current, whereby alternately one pair of contacts are connected in one polarity between the potentiometer arm and said center tap, and the other pair of contacts are connected in the other polarity between said potentiometer arm and said center tap, one contact of each pair being connected to a common connection.

9. The system claimed in claim 5, further comprising a pair of smoothing networks, one connected to each pair of contacts.

10. The system claimed in claim 5, said addition and subtraction means each comprising a resistor network.

11. A system for deriving a tracking voltage from an input data voltage intermittently sampled during sampling periods comprising means for deriving a controlled voltage the rate of change of which is directly proportional to a control voltage, means for subtracting the said controlled voltage from the input data voltage at least during the sampling periods, means for storing and employing the sampled difference voltage as the said control voltage, and means for adding the said controlled voltage to the stored difference voltage, whereby the sum voltage is an anticipatory tracking voltage.

12. A system for smoothly tracking voltage from an input, comprising means intermittently to sample a voltage during sampling periods, a voltage storage element connected to receive and store the voltage sampled by said sampling means, a velocity control amplifier connected to receive the voltage stored on said element, servo means connected to be controlled by the voltage stored on said element to derive opposite polarity substantially equal voltages, the rates of change of which are proportional to the stored voltage, means to subtract one of said opposite polarity voltages from the said voltage from the input at least during sampling periods and to apply the difference voltage to said sampling means, whereby the difference voltage is sampled and the samples stored on said storage element, and means to add the other of said opposite polarity voltages and the stored voltage, whereby the sum voltage smoothly tracks the input voltage.

13. The system claimed in claim 12, said intermittent sampling means comprising a gating circuit.

14. A system for smoothly tracking a voltage from an input, comprising a voltage stored element, a velocity control amplifier connected to receive the voltage stored on said element, servo means connected to be controlled by the voltage stored on said element to derive a controlled voltage the rate of change of which is proportional to the stored voltage, means to subtract the controlled voltage from the input voltage and to apply the difference voltage to said storage element, and means to add the controlled voltage and the stored control voltage, whereby the sum voltage smoothly tracks the input voltage.

References Cited in the file of this patent

UNITED STATES PATENTS

| Number | Name | Date |
|---|---|---|
| 2,409,448 | Rost et al. | Oct. 15, 1946 |
| 2,513,537 | Williams | July 4, 1950 |
| 2,513,988 | Wolff et al. | July 4, 1950 |
| 2,599,586 | Ross | June 10, 1952 |